United States Patent [19]
Morrison

[11] Patent Number: 5,187,540
[45] Date of Patent: Feb. 16, 1993

[54] OPTICAL SYSTEM FOR THE REMOTE DETERMINATION OF POSITION AND ORIENTATION

[75] Inventor: John M. Morrison, Edinburgh, United Kingdom

[73] Assignee: GEC Ferranti Defence Systems Limited, Stanmore, United Kingdom

[21] Appl. No.: 784,218

[22] Filed: Oct. 30, 1991

[30] Foreign Application Priority Data

Oct. 31, 1990 [GB] United Kingdom ............... 9023626
Oct. 31, 1990 [GB] United Kingdom ............... 9023639

[51] Int. Cl.[5] .................................. G01B 11/26
[52] U.S. Cl. ................................. 356/152; 356/141
[58] Field of Search ................... 356/1, 141, 152; 250/203.2

[56] References Cited

U.S. PATENT DOCUMENTS

| | | | |
|---|---|---|---|
| 4,193,689 | 3/1980 | Reymond et al. | 358/152 |
| 4,209,254 | 6/1980 | Reymond et al. | 356/152 |
| 4,315,690 | 2/1982 | Tracellier et al. | 356/152 |
| 4,396,945 | 8/1983 | DiMatteo et al. | 358/107 |
| 4,649,504 | 3/1987 | Krouglicof et al. | 364/559 X |
| 4,794,245 | 12/1988 | Auer | 250/203 R |
| 4,923,303 | 5/1990 | Lutz | 356/152 X |
| 5,085,507 | 2/1992 | Williams et al. | 356/152 |

Primary Examiner—Mark Hellner
Attorney, Agent, or Firm—Jacobson, Price, Holman & Stern

[57] ABSTRACT

An optical system, for the remote determination of the position and orientation of a body in a frame of reference, e.g. a helmet within a cockpit of an aircraft, comprises co-operating light emitting means and light sensing means. At least three of one type of said co-operating means are located on the body and scanning optic means are arranged to scan the frame of reference with a pair of planar beams. The planes of the beams are inclined to each other and are arranged to provide a light path between the co-operating means. A signal processing means is operative to provide a signal indicative of the position and orientation of a body and a time during the scan of each respective beam in which the beam is coincident with each of the said means mounted on the body. In one embodiment three light sensing means are located on the body and the planar beams are beams of light from a light emitting means. In another embodiment three light emitting means are mounted on the body and these are scanned by planar acceptance beams on to at least one light sensing means.

10 Claims, 1 Drawing Sheet

OPTICAL SYSTEM FOR THE REMOTE DETERMINATION OF POSITION AND ORIENTATION

FIELD OF THE INVENTION

This invention relates to an optical system for the remote determination of position and orientation of a body within a frame of reference.

BACKGROUND OF THE INVENTION

The invention is especially concerned with determining the position and orientation of a helmet in a cockpit of an aircraft or helicopter. This is done to control aiming systems of weapons which are aimed in accordance with the direction in which the pilots head is pointing, and also because a head-up display is sometimes reflected via a combiner mounted on the helmet or via the visor itself, and the display may need to depend on the direction in which the head is pointing. Other uses may include the determination of position and orientation of a users head in a virtual reality system, or that of, say, a tool relative to a workpiece in a computer controlled machining centre.

SUMMARY OF THE INVENTION

The invention provides an optical system, for the remote determination of the position and orientation of a body in a frame of reference, comprising co-operating light emitting means and light sensing means, at least three of one type of said co-operating means being located on said body, scanning optic means arranged to scan the frame of reference with a pair of planar beams, the planes of said two beams being inclined to each other and arranged to provide a light path between the co-operating means; and signal processing means operative to provide a signal indicative of the position and orientation of the body from the time during the scan of each respective beam at which the beam is coincident with each of the said means mounted on the body.

In one embodiment at least three light sensing means are located on the body and the planar beams are beams of light from a light emitting means.

In an alternative embodiment at least three light emitting means are located on the body and are scanned by planar acceptance beams onto at least one light sensing means.

The invention further provides an optical system for the remote determination of the position and orientation of a helmet in a cockpit, comprising at least three photosensors mounted on the helmet, and means for generating a pair of fan-shaped light beams arranged to scan the region of the helmet, the centre planes of the fan beams being inclined to each other.

In another aspect provides an optical system, for the remote determination of the position and orientation of a helmet in a cockpit, comprising at least three light sources mounted on the helmet, and means for imaging a first set of successive strips sweeping over the region of the helmet, on to a photo-sensor, and means for imaging a second set of successive strips sweeping over the region of the helmet, on to a photo-sensor, the strips of one set being inclined to those of the other.

In yet another aspect the invention provides a method for the remote determination of the position and orientation of a body in a frame of reference, at least three of either co-operating light emitting means or light sensing means being located on the body, the method comprising scanning a pair of planar beams across the frame of reference, the beams being inclined to each other and forming a light path between the means mounted on the body and the other of the co-operating means; and deducing the position and orientation of the body within the frame of reference from the time during the scan of each respective beam at which the beam is co-incident with each of the said means mounted on the body.

An optical system for the remote determination of the position and orientation of a body in a frame of reference will now be described, by way of example, with reference to the accompanying drawings, in which:

DESCRIPTION OF THE PREFERRED EMBODIMENT

Figure 1:
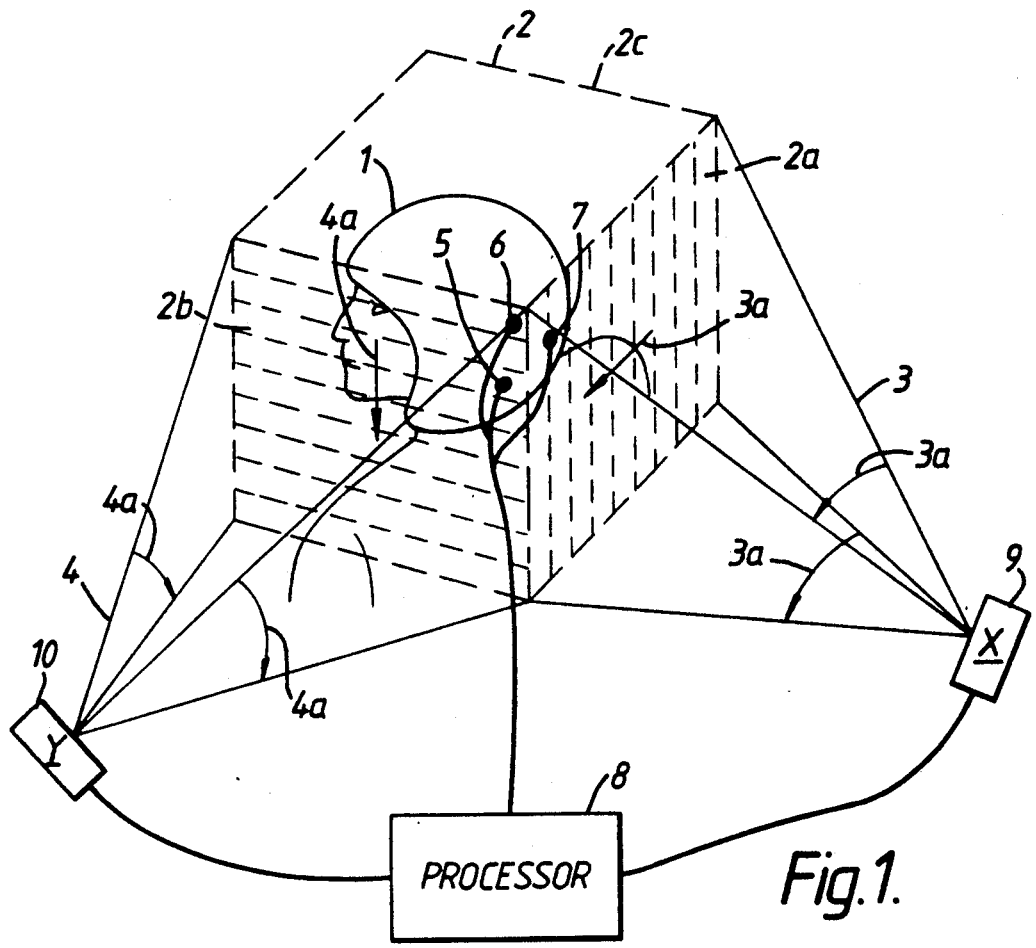
FIG. 1 is a schematic diagram of a system according to the invention.

Referring to FIG. 1, a pilot's helmet 1 can be assumed to always remain within the cubic region 2, and this region is swept by two planar fan shaped light beams, 3, 4. The centre plane of tho fan beam 3 intercepts the face 2a of the cube in vertical lines and the fan beam 4 intercepts the face 2b of the swept volume 2 in horizontal lines. The fan beams scan at a uniform velocity in the direction of the arrows 3a, 4a respectively and rapidly return to their starting point for subsequent scans.

Three photodiodes 5, 6, 7 are mounted upon the helmet and arranged in a predetermined and known way relative to each other and to the helmet 1. The output from each photodiode 5, 6, 7 is connected to a processing means which is also connected to the x and y direction beam generating means, shown schematically by boxes 9, 10, which produce the fan shaped light beams 3, 4 respectively.

The photodiodes 5, 6, 7 will produce an output when each beam crosses them. Thus, for example, if a photodiode was positioned at the centre of the upper face 2c of the swept volume 2, it would respond at the beginning of the scan of the beam 4 and half way through the scan of the beam 3. A photodiode positioned at the centre of the cube, would respond simultaneously to both beams i.e. both midway through their scan.

It will be noted that two outputs would not give a unique identification of position e.g. if two photodiodes respond exactly halfway through the scan, the photodiode could be anywhere on a horizontal line extending from the centre of the face 2a to the rear of the swept volume through the centre of the cube 2. For this reason, three photodiodes must be provided and the processing means 8 can then match these uniquely, knowing the relative positions one the pilot's helmet to the locus of the three lines identified by the pairs of outputs of the fan beams for each photodiode.

The fan beams are of different intensity to enable the respective beam or, conceivably, the combination of beams, to be distinguished from the amplitude of the output of the photodiode. Alternatively, the fan beams may be of the same intensity, and the photodiode outputs can be distinguished between by switching them on in sequence. In this case, only one photodiode will be illuminated on each scan of the fan beams.

Figure 2:
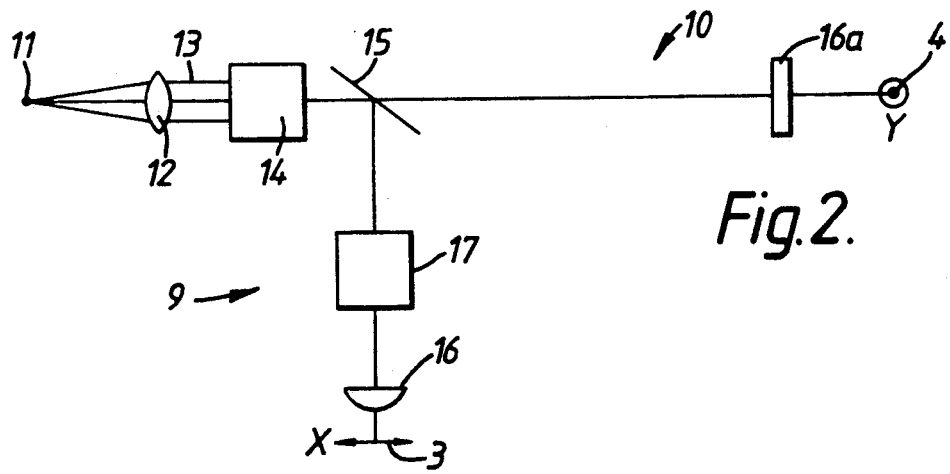
FIG. 2 is a schematic diagram of an optical arrangement for use in the system shown in FIG. 1.
Figure 3:
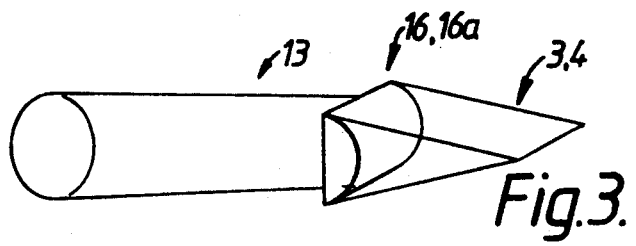
FIG. 3 illustrates the operation of the cylindrical lenses used to form the planar light beams in the system shown in FIG. 1.

Referring to FIG. 2, the fan beams 3, 4 may be generated from a single laser diode 11, the beam from which is collimated by a lens 12 to produce a cylindrical beam 13 which is incident on a mirror polygon 14. The mirror polygon 14 is a rotting drum, the outer periphery of which consists of multiple facets (not shown) arranged at an equal angle to each other. The mirror polygon 14 deflects the beam up and down, i.e. perpendicular to the plane of the drawing, and this beam is incident on a beam splitter 15 (a semi-reflecting, semi-transmitting element). The transmitted portion of the beam is focused by a cylindrical lens 18a arranged with its axis in the plane of the drawing to produce a planar beam which sweeps up and down as required by fan beam 4. The focusing of the cylindrical lens 16a, which converts an incident cylinder of radiation into a planar beam or line of radiation of the same width so the diameter of the cylindrical beam is shown in FIG. 3. A dove prism 17 rotates the beam by 90° so that the up and down movement (relative to the plane of the paper) at beam splitter 15 appears, after reflection at the beam splitter and after the Dove prism 17, as side to side movement i.e. in the plane of the paper. A cylindrical lens 16 focuses the resulting incident cylinder of radiation into a planar beam of radiation extensive perpendicular to the plane of the paper which sweeps from side to side in the manner required for fan beam 3.

In order for the fan beams to have their divergent shape, the cylindrical lenses 16 and 16a are divergent in the vertical axis as seen in FIG. 3, so that the focussed line is wider the further from the cylindrical lens.

The sweep linearity can be assumed to be of a high order if a diamond fly-cut mirror is used, and there is an opportunity to exploit a fixed reference photodiode, fixed relative to the cockpit, by arranging that this is also in the path of the sweeping fan beams. In pulse to pulse periods from the reference photodiode, a datum for the absolute position of the other photodiode outputs is provided.

In an alternative embodiment the arrangement of three photodiodes 5, 6, 7 shown can be replaced by three light emitting means, such as L.E.D.'s. The light source 11 can then be replaced by a light sensing means such as a photo-diode. The L.E.D.,s could be of differing intensity to enable them to be distinguished from one another. The same optical arrangement would then image the body with a fan shaped acceptance or imaging beam onto the light sensor.

Among the advantages of both embodiments are that the actual attachments for the helmet itself are extremely light, namely, a minimum of three photodiodes, or L.E.D.'s, as appropriate.

Although the scanned beams in FIG. 2 are traversing in orthogonal directions, they may easily be folded to produce the arrangement of fan beams shown in FIG. 1.

The photodiodes, or L.E.D.'s, should be so positioned as to be illuminated by the beams for as much of the time as possible even if the pilot turns his head. For the reason, it may be advantageous to provide additional photodiodes or L.E.D.'s so that at least three are always visible.

Variations may be made from the above described embodiments without departing from the scope of the invention. Thus, for example, it is not necessary for the two fan shaped beams to have an orthogonal relationship. They could be arranged at any convenient angles to the left and right of the rear of the cockpit. It is not necessary for the beams to be generated by the same laser diode, indeed, if they were generated by different, laser diodes, this provides a means of distinguishing between the two beams. Further, photosensors other than photodiodes could be used and light sources other than laser diodes could be used. Also, two mirror polygons could be used to produce the up and down and side to side scans required by the cylindrical lenses. These mirror polygons would be arranged after the beam splitter 15, and the Dove prism 17 would then be dispensed with.

The term photosensor, photodiode L.E.D. and light beams are to be understood as being not limited to visible light and to include infrared radiation.

As an alternative to the L.E.D.'s affixed to the helmet, a multiple fibre optic bundle may be used instead. This could be of the large diameter plastic variety, illuminated by a single light source either on or off helmet, each of the individual fibres being place in the appropriate positions that the L.E.D.'s would have occupied on the helmet and orientated in the general direction of the sensing means. With the inner fibre core having a higher refractive index than the outer cladding, one has the appropriate numerical aperture gain over a single L.E.D.. It also caters for the redundancy potential in the opportunity to have two light sources. The fibre optic helmet light source allows lightweight attachment, no electrical connections, and no electromagnetic interference.

I claim:

1. An optical system, for the remote determination of the position and orientation of a body and a frame of reference, comprises light emitting means; beam splitting means for splitting light received from the emitting beams into two collimated substantially cylindrical beams; at least three light sensing means located on said body; scanning optic means including two divergent cylindrical lenses each operative to produce from a cylindrical beam a planar fan shaped beam diverging from its respective lens towards the frame of reference, said scanning optic means being further arranged to scan the frame of reference with the pair of planar fan-shaped beams, the planes of said two beams being inclined to each other; and signal processing means operative to provide a signal indicative of the position and orientation of the body from the time during the scan of each respective beam at which the beam is coincident with each of the said light sensing means mounted on the body.

2. An optical system, as claimed in claim 1, in which both beams are produced from a single laser diode by means of said beam splitter.

3. An optical system, as claimed in claim 1, in which both beams are acceptance beams and are imaged onto a single light sensor by means of a beam splitter.

4. An optical system, as claimed in claim 1, in which the planar beams are caused to scan the frame of reference by means of a rotating mirror polygon.

5. An optical system, as claimed in claim 2, in which a dove prism is operative together with the beam splitter to rotate one beam with respect to the other so that the planes of the two beams are substantially at right angles to each other.

6. An optical system, as claimed in claim 1, in which the body is a pilot's helmet and the frame of reference is located within the cockpit of an aircraft.

7. An optical system, for the remote determination of the position and orientation of a body in a frame of reference, comprises at least three light emitting means mounted on said body; scanning optic means including two divergent cylindrical lenses each operative to produce a planar fan-shaped acceptance beam diverging from the lens towards the frame of reference, the scanning optic means further including a rotary mirror arranged for scanning the frame of reference with the pair of fan-shaped beams, the planes of the said two beams being inclined to each other; beam splitting means and further lens means being operative to combine the two acceptance beams and produce a collimated focussed image for receipt by a single photosensor; and signal processing means operative to provide a signal indicative of the position and orientation of the body from the time during the scan of each respective beam at which the beam is coincident with each of the said light emitting means mounted on the body.

8. An optical system, as claimed in claim 7, in which a dive prism is operative together with the beam splitter to rotate one beam with respect to the other so that the planes of the two beams are substantially at right angles to each other.

9. An optical system, as claimed in claim 7, in which the planar beams are caused to scan the frame of reference by means of a rotting mirror polygon.

10. An optical system, as claimed in claim 7, in which the body is a pilot's helmet and the frame of reference is located within the cockpit of an aircraft.

* * * * *